United States Patent

Van Raden

[15] 3,648,791
[45] Mar. 14, 1972

[54] PNEUMATIC TRUCK WEIGHING SCALE WITH ISOTABLE RESERVOIRS

[72] Inventor: Frederick F. Van Raden, Hollsboro, Oreg.
[73] Assignee: Peerless Trailer and Truck Service, Inc., Tualatine, Oreg.
[22] Filed: Jan. 21, 1971
[21] Appl. No.: 108,457

[52] U.S. Cl. .................................................... 177/209
[51] Int. Cl. .................................................. G01g 5/04
[58] Field of Search ........................... 177/208, 209, 254, 134

[56] References Cited

UNITED STATES PATENTS

| 2,052,116 | 8/1936 | Strauss | 177/209 |
| 2,093,141 | 9/1937 | Sonsalla | 177/209 |
| 3,115,944 | 12/1963 | Weber | 177/209 |
| 3,220,500 | 11/1965 | Wilmeth | 177/209 |

Primary Examiner—Richard B. Wilkinson
Assistant Examiner—George H. Miller, Jr.
Attorney—Buckhorn, Blore, Klarquist & Sparkman

[57] ABSTRACT

A scale for weighing truck axle loads and the like includes a platform supported by four self-leveling air springs with four reservoirs in parallel with the springs. After the springs have been stabilized, the reservoirs are closed off from the springs and are connected together to equalize their pressures and to an air pressure gauge which gives the weight being weighed.

5 Claims, 4 Drawing Figures

FREDERICK F. VAN RADEN
INVENTOR

BY
BUCKHORN, BLORE, KLARQUIST & SPARKMAN
ATTORNEYS

PNEUMATIC TRUCK WEIGHING SCALE WITH ISOTABLE RESERVOIRS

This invention relates to a pneumatic scale for weighing trucks, and more particularly to a portable pneumatic scale assembly.

An object of the invention is to provide a new and improved pneumatic scale for weighing trucks.

Another object of the invention is to provide a new and improved pneumatic scale assembly.

A further object of the invention is to provide a scale in which a scale platform is supported by four expansible and contractable pneumatic supports which are supplied with air at different pressures and equal volumes from the supports are mixed together to average the pressures which gives a measure of the weight.

The invention provides a truck weighing scale in which a platform is supported on a base by air springs supplied with air under different pressures proportional to different loads on the air springs, equal volume reservoirs individual to the air springs are disconnected from the springs and are connected together to equalize the pressure, and the average pressure is measured to give the weight on the platform.

Figure 1:
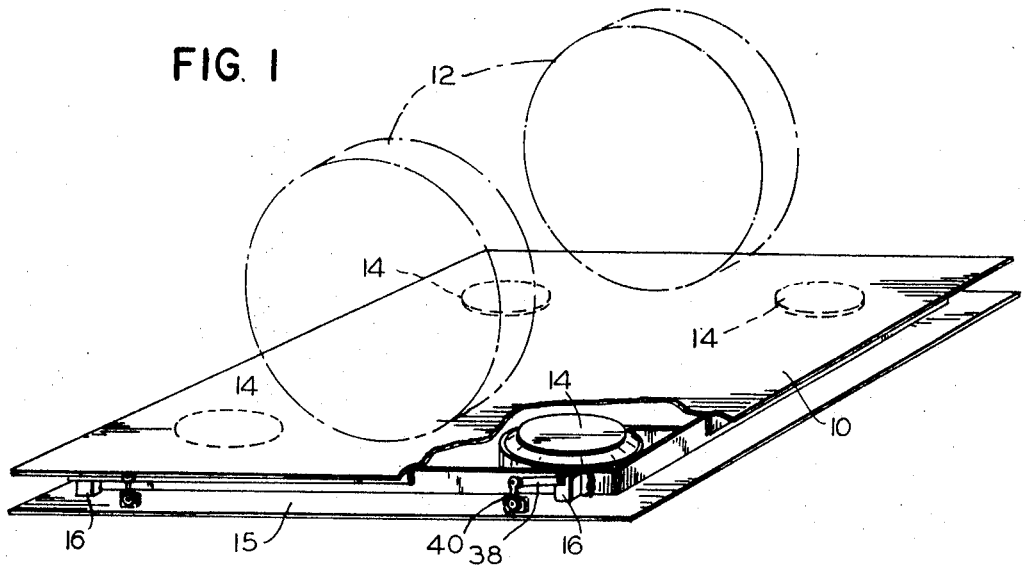
FIG. 1 is a perspective view of a scale forming one embodiment of the invention.
Figure 2:
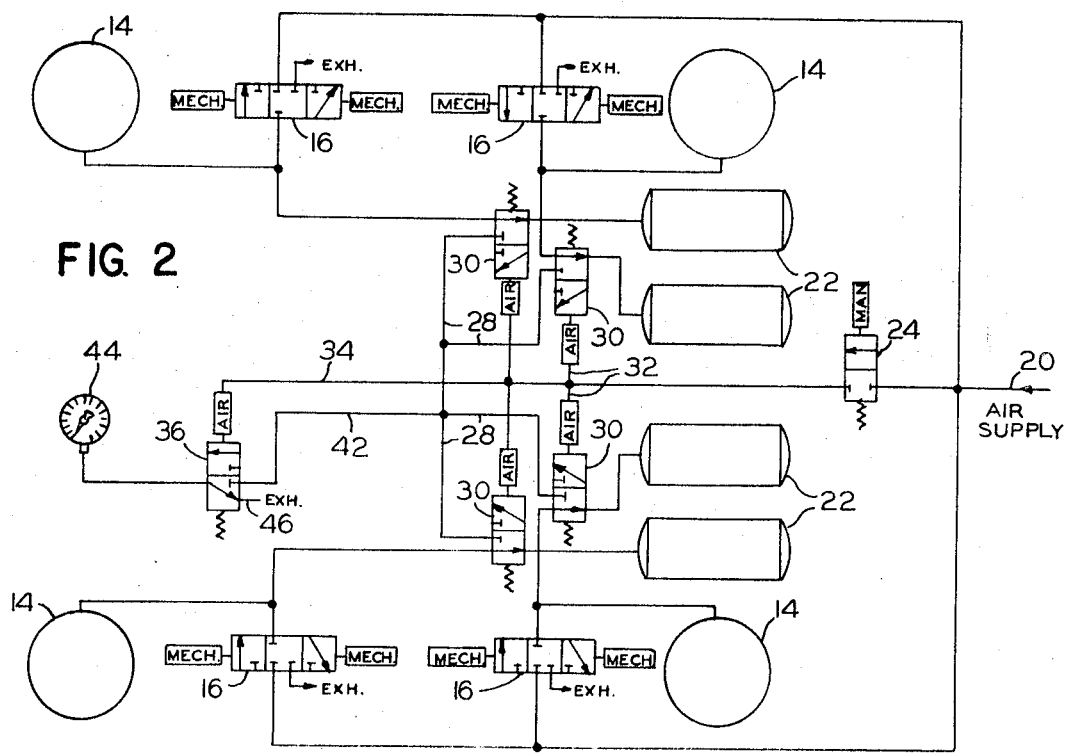
FIG. 2 is a schematic view of a pneumatic system of the scale of FIG. 1.
Figure 3:
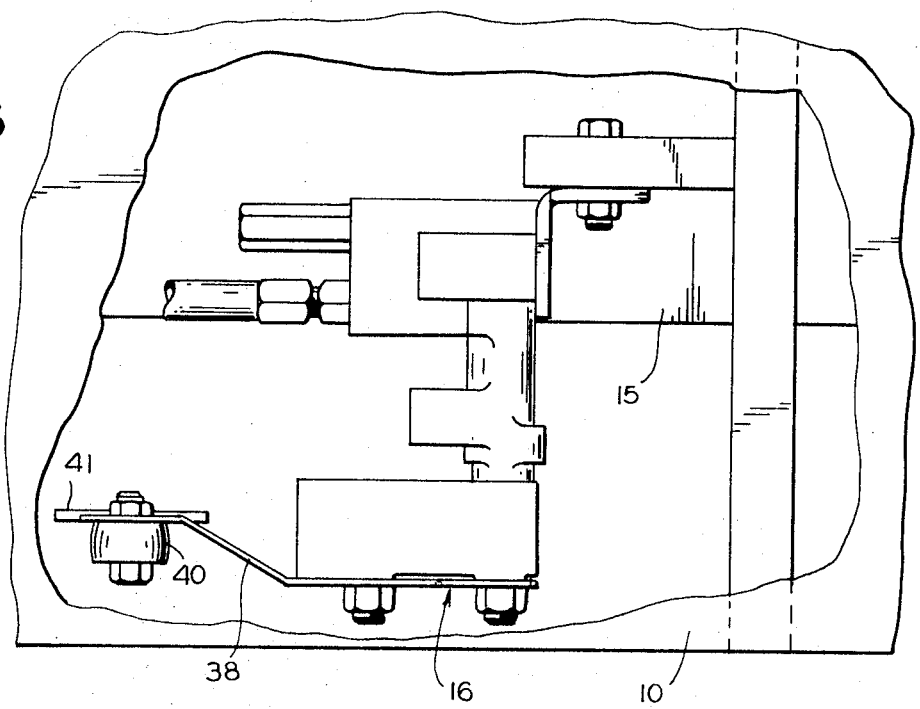
FIG. 3 is an enlarged, fragmentary, top plan view of the scale of FIG. 1.
Figure 4:
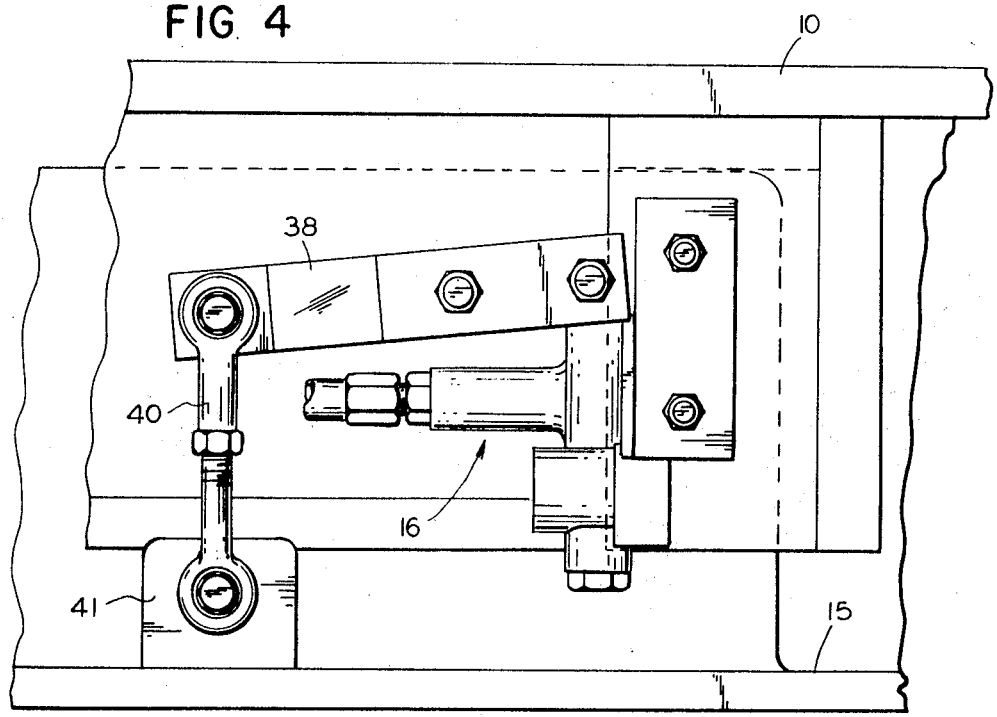
FIG. 4 is an enlarged, fragmentary, side elevation view of the scale of FIG. 1.

Referring now in detail to the drawings, there is shown therein a truck weighing scale forming one embodiment of the invention including a platform 10 on which wheels 12 of a vehicle being, for example one axle of a truck, are positioned. The platform is supported above the base by four air bags or springs 14 located at the corners. Each of the air springs has a self-leveler 16 which brings each spring to the same predetermined height regardless of the weight on the air spring. The air springs and self-levelers are standard components of load leveling systems.

The air springs 14 and four measuring reservoirs 22 are connected to a line 20 leading to a source of air under pressure (not shown) by valves 16. Valves 30 normally connect the air springs 14, one to its associated reservoir 22. A pilot valve 24 may be actuated manually to actuate the valves 30 to connect the reservoirs 22 to lines 28 connected to an equalization line 42. This also causes the valves 30 to close off the reservoirs from the air springs 14. At the same time a pilot valve 36, whose actuator is connected by a line 34 to the pilot valve 24, is actuated to connected an air pressure gauge 44 to the equalization line 42.

To weigh an axle and its load, the wheels 12 are moved onto the platform 10. The air under pressure is supplied to the air springs 14 and the reservoirs 22 under control of the valves 16. The valves 16 regulate the pressure of the air in each air bag to expand or contract each air bag to bring it to a selected height, and the reservoir 22 associated with each air bag has, of course, the same pressure as that air bag. At this time each air bag and its associated reservoir has a pressure proportionate to the load on that air bag. Then the valve 24 is actuated manually to supply air under pressure to all of the actuating lines to the valves 30 and the actuating line 34 to the pilot valve 36, and the valves 30 and 36 are actuated. The valves 30 then disconnect the reservoirs from the air bags and connect the reservoirs to an equalizing line 42. The valve 36 disconnects air pressure gauge 44 from an exhaust line 46 and connects the air pressure gauge 44 to the equalizing line 42. The four reservoirs are of equal volume and the pressures thereof average out in the equalizing line 42, which average pressure is directly proportional to the total load on the air springs. The air gauge is calibrated in units of weight and measures the average pressure to give the load on the platform.

After a load has been weighed, the operator releases the valve 24, and the valves 30 and 36 are spring returned to their normal conditions. Another axle load then may be weighed. The four reservoirs provide a constant volume, while that in the air springs varies somewhat with different loads and load distributions, the constant volume of air reservoirs making accurate weight determination possible.

The valves 16 are mounted rigidly on the platform 10 and are actuated by levers 38 which are, in turn, actuated by adjustable links 40 pivotally mounted on ears 41 fixed to the base 15. The links 40 are pivotally connected to the outer ends of the levers 38. Flexible hoses connect the valves 16 to the air supply 20, the air springs 14 and the reservoirs 22. When the portion of the platform over one of the air springs 14 is depressed below its normal level, the lever 38 and link 40 actuate the valve 16 associated with that air spring to admit additional air under pressure to that air spring to raise the platform to its normal position shutting off the valve 16. When the portion of the platform adjacent an air spring raises above its normal level, as when the load thereon is lessened, the lever 38 and link 40 actuate the valve 16 to exhaust air from that air spring until the pressure in that air spring is lowered sufficiently that the platform returns to its normal level.

The above-described scale is easily portable, and is quite accurate, within about 1 percent of accuracy for variations in temperature normally encountered.

What is claimed is:

1. In a scale,
    a platform,
    a predetermined number of pneumatic supports supporting the platform and a load to be weighed on the platform,
    a plurality of reservoirs of equal size and equal in number to the supports,
    pressure transmitting means for coupling each reservoir to one of the supports to transmit the pressure of that support to that reservoir,
    means for isolating the reservoirs from the supports and connecting the reservoirs together to equalize the pressure in the reservoirs,
    and means for measuring the equalized pressure of the reservoirs.

2. In a scale,
    a platform for supporting a load to be weighed,
    a plurality of pneumatic supports for supporting the platform,
    a plurality of reservoirs all of the same volume, there being one reservoir associated with each support,
    a plurality of leveling means for supplying air under pressure to each of the supports sufficient to extend each support a predetermined extent and to supply each reservoir associated with one of the supports with air under the same pressure as that supplied to the last-mentioned support,
    means for closing off the reservoirs from the self-leveling means and the supports and connecting the reservoirs together to equalize the pressures in the reservoirs,
    and indicating means responsive to the equalized pressure.

3. In a scale,
    a platform,
    a base,
    four air springs supporting the platform on the base, means for supplying air under pressure,
    four self-leveling valve mechanisms supplied with air under pressure from the air source for supplying air under pressure to the air springs,
    four reservoirs,
    four valves for first connecting each of the reservoirs to one of the air springs and then closing the reservoirs from the air springs and connecting the reservoirs together,
    and gauge means responsive to pressure of air in the reservoirs for indicating weight on the platform.

4. The scale of claim 3 wherein the valves are pilot valves and including a manually operable valve for actuating the pilot valves.

5. The scale of claim 4 including a valve actuated by the manually operable valve for connecting the reservoirs to the gauge means when the pilot valves are actuated to connect the reservoirs together.

* * * * *